United States Patent
Gehret et al.

(10) Patent No.: US 9,608,970 B1
(45) Date of Patent: *Mar. 28, 2017

(54) SHARING KEYS

(71) Applicant: MicroStrategy Incorporated, Vienna, VA (US)

(72) Inventors: John Gehret, Washington, DC (US); Siamak Ziraknejad, Reston, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,042

(22) Filed: Jan. 16, 2015

Related U.S. Application Data

(60) Provisional application No. 61/928,070, filed on Jan. 16, 2014.

(51) Int. Cl.
 *H04L 29/06* (2006.01)
(52) U.S. Cl.
 CPC .................. *H04L 63/06* (2013.01)
(58) Field of Classification Search
 CPC . H04L 2209/56; H04L 63/08; H04L 63/0853; H04L 63/18; H04L 63/0838; H04L 63/061; H04L 63/062; H04L 63/0807; H04L 63/0846; H04L 63/0884; H04L 9/088; H04L 9/32; H04W 12/06; H04W 12/08; G06Q 10/02; G06Q 20/3674; G06Q 20/382; G06Q 30/06; G06F 21/34; G06F 21/335; G06F 2221/2103
 USPC ........................ 713/168, 185; 726/5, 18, 4, 9
 See application file for complete search history.

(56) References Cited

U.S. PATENT DOCUMENTS

| | | |
|---|---|---|
| 6,000,609 A | 12/1999 | Gokcebay et al. |
| 6,862,576 B1 | 3/2005 | Turner et al. |
| 7,012,503 B2 | 3/2006 | Nielsen |
| 7,325,132 B2 | 1/2008 | Takayama et al. |
| 7,337,332 B2 | 2/2008 | Tsuria |
| 7,520,419 B2 | 4/2009 | Libin et al. |
| 8,437,746 B1 | 5/2013 | Breau |

(Continued)

OTHER PUBLICATIONS

Campbell (Review: Kwikset's new iPhone compatible 'Kevo keyless deadbolt lock, 2013, retrieved Jan. 11, 2016 from http://appleinsider.com/articles/13/10/30/review-kwiksets-bluetooth-enabled-kevo-deadbolt-lock).*

(Continued)

*Primary Examiner* — Brian Shaw
(74) *Attorney, Agent, or Firm* — Fish & Richardson P.C.

(57) ABSTRACT

The subject matter described in this specification includes a computer-readable medium storing instructions that cause one or more processors to perform various operations including receiving, from a first client device associated with a user account of a first user, a request for sharing a key. The key is associated with the user account of the first user, and permits access to a resource. The operations include generating, at a server, one or more representations of the key, transmitting the representations of the key to the first client device, and receiving, from a second client device associated with a user account of a second user, a request to access the key. The request to access the key is derived from one of the one or more representations of the key. The operations further include communicating, to the second client device, a message indicating whether access to the key has been granted.

24 Claims, 10 Drawing Sheets

(56) References Cited

U.S. PATENT DOCUMENTS

| | | | |
|---|---|---|---|
| 8,665,212 | B2 | 3/2014 | Lacey |
| 8,909,141 | B2 | 12/2014 | Hansen |
| 9,189,900 | B1* | 11/2015 | Penilla ................ H04W 4/046 |
| 2002/0180582 | A1 | 12/2002 | Nielsen |
| 2004/0039919 | A1 | 2/2004 | Takayama et al. |
| 2004/0219903 | A1 | 11/2004 | Despain |
| 2005/0088279 | A1 | 4/2005 | Denison et al. |
| 2006/0255910 | A1 | 11/2006 | Fukushima |
| 2007/0096866 | A1 | 5/2007 | Denison et al. |
| 2007/0198430 | A1* | 8/2007 | Takahashi ............... G06F 21/10 |
| | | | 705/59 |
| 2007/0247276 | A1 | 10/2007 | Murchison et al. |
| 2008/0109247 | A1 | 5/2008 | Katayama |
| 2008/0142671 | A1 | 6/2008 | Bourrieres et al. |
| 2008/0149711 | A1 | 6/2008 | Griffits et al. |
| 2008/0218350 | A1 | 9/2008 | Flores |
| 2008/0297481 | A1 | 12/2008 | Higginson |
| 2009/0226050 | A1 | 9/2009 | Hughes |
| 2009/0319316 | A1 | 12/2009 | Westerfeld et al. |
| 2010/0071424 | A1 | 3/2010 | Tsuruta |
| 2010/0082491 | A1 | 4/2010 | Rosenblatt et al. |
| 2011/0210818 | A1 | 9/2011 | Denison et al. |
| 2012/0011367 | A1 | 1/2012 | Denison |
| 2012/0109419 | A1 | 5/2012 | Mercado |
| 2012/0322372 | A1 | 12/2012 | Hansen |
| 2013/0009858 | A1 | 1/2013 | Lacey |
| 2013/0120106 | A1 | 5/2013 | Cauwels et al. |
| 2013/0127593 | A1 | 5/2013 | Kuenzi et al. |
| 2013/0132169 | A1 | 5/2013 | Dooley et al. |
| 2013/0211891 | A1 | 8/2013 | Daniel et al. |
| 2013/0212248 | A1* | 8/2013 | Neafsey ................ G06F 21/45 |
| | | | 709/223 |
| 2013/0305319 | A1* | 11/2013 | Matthews, III ....... G06F 3/0484 |
| | | | 726/4 |
| 2013/0312116 | A1 | 11/2013 | Park |
| 2013/0335193 | A1 | 12/2013 | Hanson et al. |
| 2014/0002239 | A1 | 1/2014 | Rayner |
| 2014/0129630 | A1 | 5/2014 | Nikain |

OTHER PUBLICATIONS

Brookings (Riding the Mobile Wave: The Future of Mobile Computing a Conversation with CEO of Microstrategy Michael Saylor, 2012, Chapters 1, 5 and 6).*
Spencer (Ushering in a New Era of Mobile ID, 2012, retrieved Jan. 8, 2016 from http://mobilemarketingmagazine.com/ushering-new-era-mobile-id).*
"Evaluation of the world's first pilot using NFC phones for check-in and hotel room keys," Report, ASSA ABLOY, retrieved on May 2, 2012.
'AssaAbloy.com' [online]. "New generation of access control and mobile access control with NFC technology Assa Abloy," Sep. 2011, [retrieved on May 21, 2012]. Retrieved from the Internet: URL<http://www.assaabloy.com/en/com/Press-News/News/2011/NFC-enabled-mobile-access-in-a-physical-access-control-world/>. 2 pages.
'AssaAbloy.com' [online]. "GSMA highlights Assa Abloy NFC mobile keys solutions," 2012, [retrieved on May 21, 2012]. Retrieved from the Internet: URL<http://www.assaabloy.com/en/com/Press-News/News/2012/NFC-access-control-highlighted-by-GSMA-at-Mobile-World-Congress/>. 2 pages.
'AssaAbloy.com' [online]. "Keyless entry with Assa Abloy mobile keys for secure and environment friendly access control," 2011, [retrieved on May 21, 2012]. Retrieved from the Internet: URL<http://www.assaabloy.com/en/com/Products/ASSA-ABLOY-Mobile-Keys/>. 2 pages.
AssaAbloy.com' [online]. "Assa Abloy Mobile Keys at ISC West Las Vegas," Apr. 2011, [retrieved on May 21, 2012]. Retrieved from the Internet: URL<http://www.assaabloy.com/en/com/Press-News/News/2011/ASSA-ABLOY-Mobile-Keys-Platform-Debuts-at-ISC-West/>. 2 pages.
'AssaAbloy.com' [online]. "Bjorn Hellgren unlocks his hotel room with Assa Abloy Mobile Keys," May 2011, [retrieved on May 21, 2012]. Retrieved from the Internet: URL<http://www.assaabloy.com/en/com/Press-News/News/2011/The-customer-experience-of-ASSA-ABLOY-Mobile-Keys/>. 2 pages.
'GadgetVenue.com' [online]. "Mobile phone car key," Oct. 2008, [retrieved on May 21, 2012]. Retrieved from the Internet: URL<http://www.gadgetvenue.com/mobile-phone-car-key-10011618/>. 3 pages.
Wikipedia, "Certificate authority," Wikipedia [online] Aug 8, 2012 [retrieved on Aug. 15, 2012]. Retrieved from the Internet: <URL: http://en.wikipedia.org/wiki/Certificate_authority>, 4 pages.
Wikipedia, "Certificate signing request," Wikipedia [online] Aug 20, 2013 [retrieved on Aug. 24, 2012]. Retrieved from the Internet: <URL: http://en.wikipedia.org/wiki/Certificate_signing_request>, 4 pages.
Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.
Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.
Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.
Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.
Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.
Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.
Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.
Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.
Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.
Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

* cited by examiner

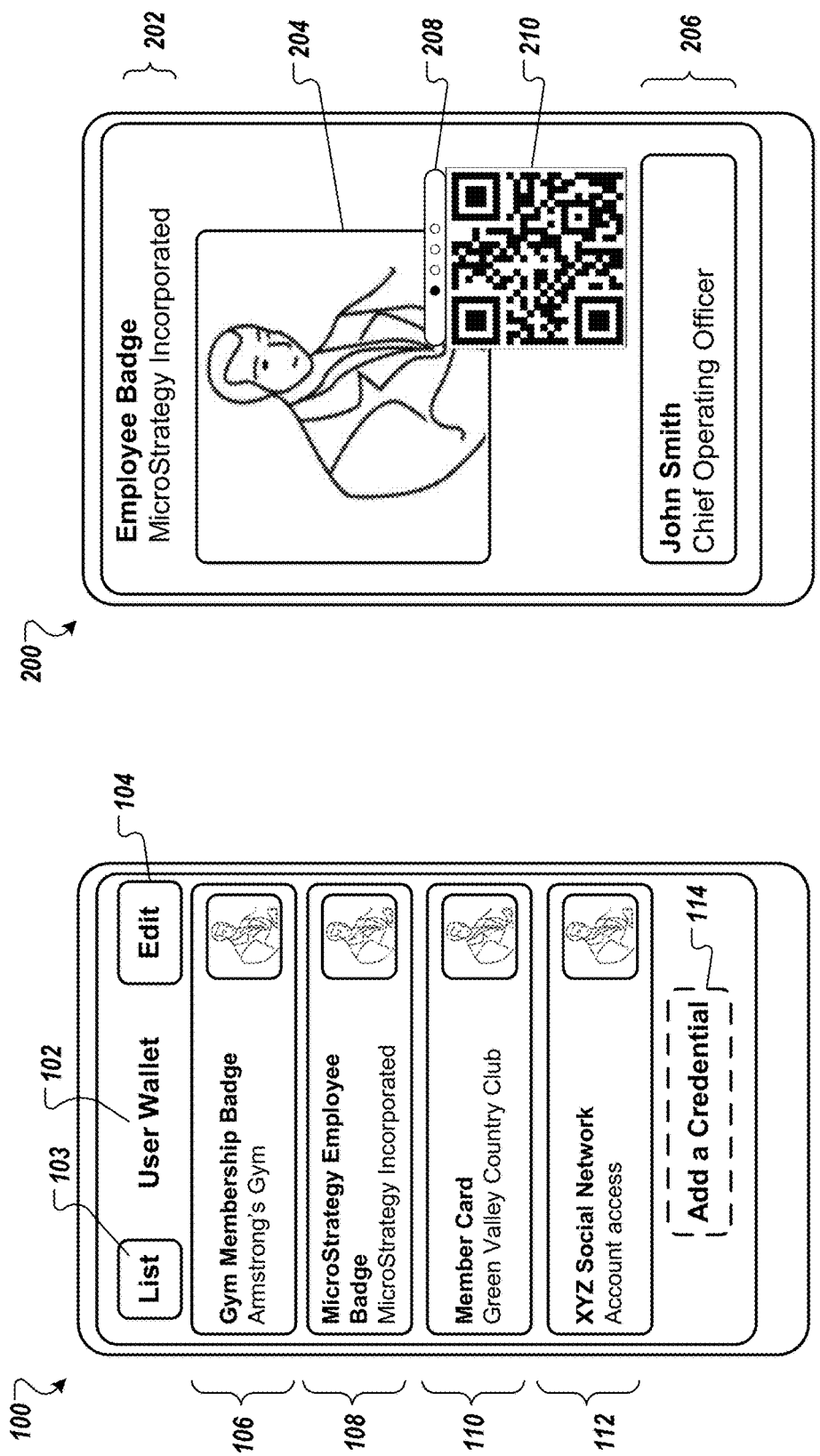

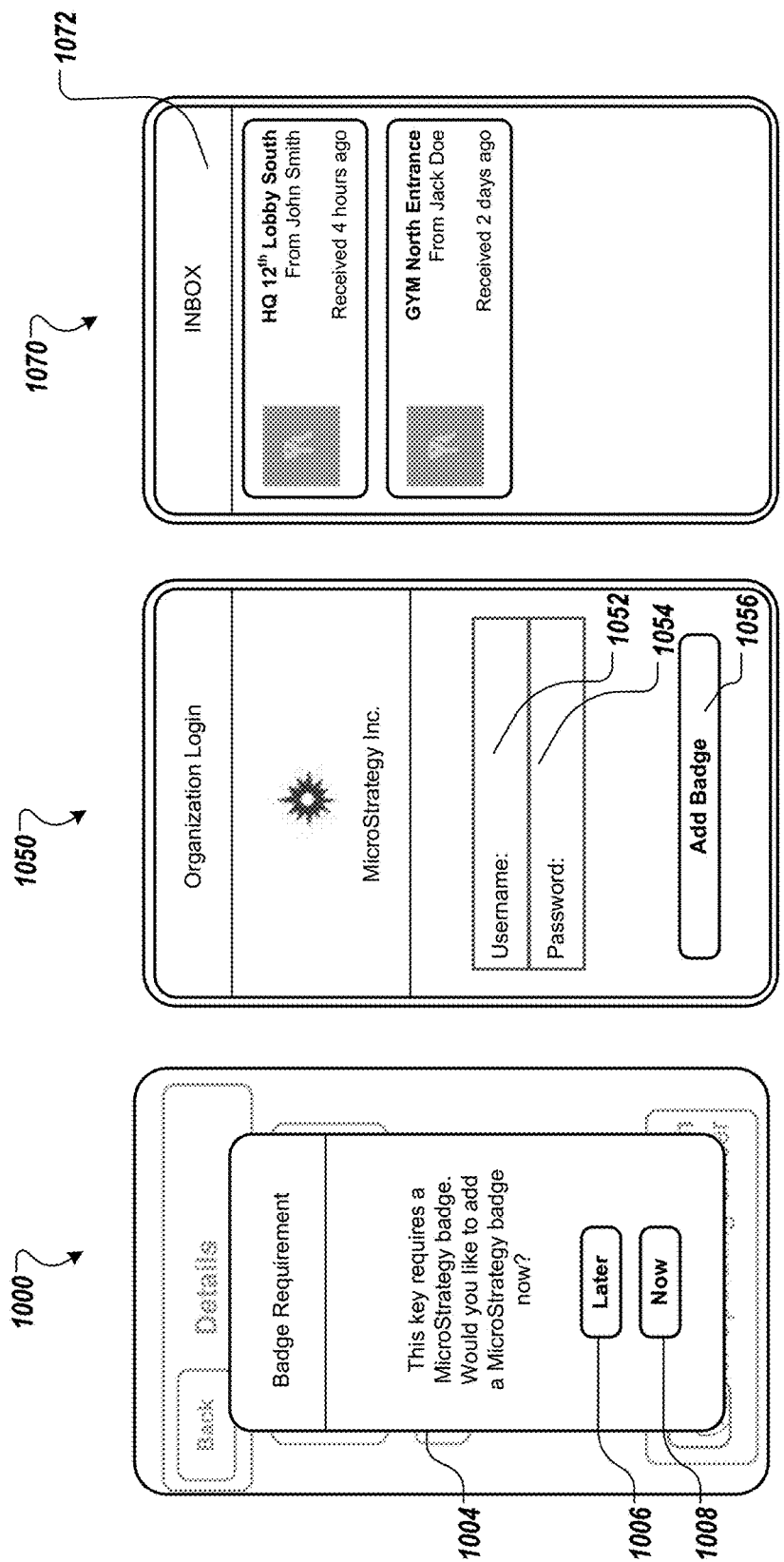

SHARING KEYS

CROSS REFERENCE TO RELATED APPLICATION

This application claims the benefit of U.S. provisional patent application No. 61/928,070, filed on Jan. 16, 2014, which is incorporated by reference herein.

TECHNICAL FIELD

This specification generally relates to user credentials.

BACKGROUND

A person may be associated with a credential that, for example, permits the person to access resources (e.g., physical and/or logical resources) and/or events.

SUMMARY

In general, one aspect of the subject matter described in this specification may include a non-transitory computer-readable storage medium including instructions, which upon execution by one or more processors, cause the one or more processors to perform various operations including receiving, from a first client device associated with a user account of a first user, a request for sharing a key. The key is associated with the user account of the first user, and permits access to a resource. The operations also include generating, at a server, one or more representations of the key, transmitting the one or more representations of the key to the first client device, and receiving, from a second client device associated with a user account of a second user, a request to access the key. The request to access the key is derived from one of the one or more representations of the key. The operations further include communicating, to the second client device, a message indicating whether access to the key has been granted.

In another aspect, the subject matter described in this specification can include a non-transitory computer-readable storage medium including instructions, which upon execution by one or more processors, cause the one or more processors to perform various operations including receiving, at a client device of a first user, a selection of a key associated with a credential. The credential is associated with a user account of the first user, and the key permits access to a resource. The operations also include providing, at the client device, an interface configured to allow the first user to share the selected key with one or more other users, transmitting, from the client device to a server, a request for a representation of the key, and receiving, from the server, the representation of the key, wherein the representation can be provided to the one or more other users.

Implementations can include one or more of the following. The one or more representations of the key can include a Quick Response (QR) code, an acoustic code, and an alphanumeric code. The key can be associated with a first credential associated with the user account of the first user. A second credential can be associated with the user account of the second user. The operations can include determining whether the first credential and second credential are issued by the same organization, and granting the access to the key upon determining that the first and second credentials are issued by the same organization. Communicating the message can include communicating an indication that access to the key has been denied, upon determining that the first credential and second credential are issued by different organizations. The one or more representations of the key can be associated with one or more constraints on accessing the resource using the representations of the key. The one or more constraints can include at least one of a time, a location, and a presence of the first user. The message can include communicating an indication that access to the key has been denied upon determining that the request to access the key is received outside the time identified by the one or more constraints. The one or more constraints can include an identification of a predetermined number of times the resource can be accessed using the representations of the key. Communicating the message can include communicating an indication that access to the key has been denied, upon determining that the key has been accessed the predetermined number of times. A message indicating that the second user account has been associated with the key can be communicated to the first client device. The operations can include receiving, from within the user account of the second user, a request to access the resource, and allowing an access to the resource based on verifying that the second user account is associated with the key.

Another interface can be provided at the client device to allow the first user to select a representation of the key from multiple representations of the key. Yet another interface can be provided at the client device to allow the first user to specify one or more constraints associated with accessing the resource using the representation of the key. The one or more constraints can include a time range during which the resource can be accessed, or identify a number of times the resource can be accessed. The operations can include initiating a transmission of the representation to a client device of a second user.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 1 is an illustration of an example of a user interface that enables a user to select from among various credentials.

FIG. 2 is an illustration of an example of a representation of a credential.

FIGS. 10A-10B are illustrations of example user interfaces associated with a secondary authentication requirement for accessing a key.

FIG. 10C is an illustration of an example user interface showing a list of received items within a user account.

DETAILED DESCRIPTION

Figure 5:
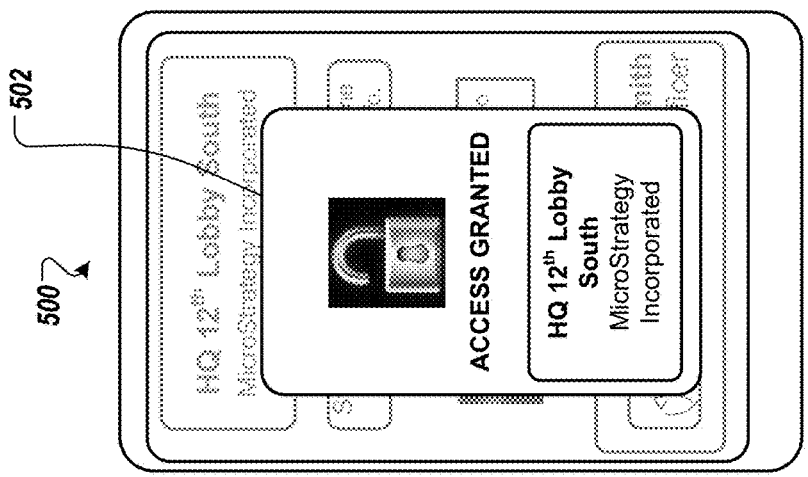
FIG. 5 is an illustration of an example user interface that provides notification of an access grant.

In some instances, representations of credentials for groups of users or for individuals are generated. The credentials can be, for example, badges reflecting membership in a group (e.g., employees of a company, graduates of a college, gym club memberships, etc.), identity credentials (driver's licenses, passports, visas, police badges etc.), health insurance cards, loyalty cards, badges to gain entrance to a location or event, a ticket for entry to a location or event, etc.

In some implementations, a credential can be associated with various electronic or virtual keys that can be used for accessing different resources. For example, a credential associated with employment with a company (e.g., an employee badge) can include or otherwise be associated with one or more virtual keys that can be used (for example on a mobile device) to electronically unlock doors within the physical premises of the company's office space. The virtual keys (also referred to herein as keys) may also be shared with other users. For example, an employee in possession of a virtual key to access a company gymnasium can share the key with another user (e.g., a guest of the company), such that the user can also access the gymnasium using the shared key. Techniques described in this document allow a first user to share a virtual key with a second user without having to communicate via e-mail, social network etc. For example, the first user may obtain a representation of the key (e.g., an alphanumeric code) and share it with the second user verbally (e.g., in-person, or over phone) such that the second user can input the representation on a client device to gain access to a corresponding resource. The representation of the key can also include, for example, a quick response (QR) code or bar code that can be displayed on the first user's client device and scanned using the second user's client device to access the corresponding resource. In some implementations, the representation of the key can be transferred between the first and second client devices using, for example, an acoustic signal based communication, a Bluetooth® communication, an infrared communication, a near field communication (NFC), or a Wi-Fi based communication. In some implementations, additional constraints can be imposed on the shared key. For example, the shared key can be configured to be valid only for a pre-determined period of time or can be configured to allow access to the corresponding resource only once.

When a credential issuing organization assigns a key to a user, a record can be created in the user's account within a credential management system, wherein the record indicates that the credential issuing organization has granted the user access to the key. When that user decides to share the key with another user, a share instance of the key can be created within the credential management system. After the key has been shared successfully with the intended recipient, another record can be created within the intended recipient's account, wherein the record links the intended recipient's account to the share instance. This allows the recipient to access to the corresponding resource (provided any relevant constraints associated with the share instance are satisfied) via a representation of the key that is linked to the share instance.

Credentials and associated keys can be maintained on and/or accessed from client devices (e.g., mobile computing devices like smart phones and tablet computers) and credentials can be represented in various forms. A server, or collection of servers, can manage and distribute credentials and keys to appropriate users' client devices. Users may operate the client devices to present representations of the credentials or keys for validation, and the representations may be validated using suitable mechanisms.

Examples of different representations for credentials and mechanisms for validating the different representations will now be described. In certain implementations, credentials can be represented by alphanumeric codes, optical machine-readable representations, acoustic signals, and/or near-field communication (NFC) signals.

A first form of representation for a credential is an alphanumeric code. As referred to herein, an alphanumeric code may be a sequence of numbers and/or letters (e.g., 4 to 24 characters) that is associated with a credential and a user. In some instances, a given alphanumeric code may be time-varying (e.g., will only be valid for a certain time period). To initialize an alphanumeric code, a server associates a given alphanumeric code with a credential, and distributes the alphanumeric code to the appropriate client device or devices.

To validate an alphanumeric code, a user presents the alphanumeric code to a validating device (e.g., a client device operated by a user or a processing system operated by a validating entity). The validating device may validate the alphanumeric code by transmitting a validation request message, which includes the alphanumeric code, to the server. When the server receives the validation request message, it attempts to confirm that the presented representation of the credential is valid. For example, the server may parse the alphanumeric code to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric code) with data associated with the retrieved credential.

Upon successful validation, the server sends the validating device a validation response indicating that the representation for the credential was valid (e.g., the presented alphanumeric code matches a valid alphanumeric code for the credential). In turn, the validating device may then provide an indication that the representation presented by the user or the third-party was valid.

Alternatively or in addition, a validating device may validate an alphanumeric code for a credential locally without requiring interaction with a server. For example, the representation for the credential provided by the third-party may be associated with a certificate associated with the third-party (e.g., a public key infrastructure (PKI) certificate), which may be stored locally at the validating device. The validating device may then compare information decoded from the alphanumeric code with information from the certificate to determine that the alphanumeric code is valid.

Another form of representation for a credential is an optical machine-readable representation. As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a QR code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data. In other implementations, optical machine-readable representations of credentials may encode other identifiers that are linked to or otherwise associated with credential identifiers.

To generate an optical machine-readable representation, a client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, a client device may output an optical machine-readable representation to a display of the client device. A validating device can scan the portion of the client device's display showing the representation of the credential and decode the representation of the credential to generate a set of alphanumeric characters that were encoded in the representation of the credential. In particular, the validating device may output a reticle defining a field of view from a camera operatively coupled to the validating device. This reticle can be used to scan the optical machine-readable representation of the credential from the relevant portion of the client device's display.

The validating device may use any suitable mechanism to scan and decode the optical machine-readable representation of the credential. For example, the validating device may access a function or library routine that captures and decodes QR codes and/or barcodes using a camera operatively coupled to the validating device. Suitable libraries may include, for example, RedLaser or Zxing.

In some implementations, the validating device may then validate the optical machine-readable representation of the credential by transmitting a validation request message to a server. The validation request message may include data corresponding to the alphanumeric characters that were encoded in the optical machine-readable representation of the credential. When the server receives the validation request message, it attempts to confirm that the presented representation of the credential is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the representation for the credential was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an optical machine-readable representation locally without requiring interaction with a server. For example, the optical machine-readable representation for the credential may include a certificate associated with the client device of the user or third-party presenting the optical machine-readable representation for validation. Alternatively or in addition, the representation for the credential may be associated with a certificate that is already stored locally at the validating device. The validating device may then compare information decoded from the optical machine-readable representation with information from the certificate to determine that the optical machine-readable representation is valid.

Yet another form of representation for a credential is an acoustic signal. As described herein, an acoustic signal is an oscillation of pressure waves transmitted through the air that are modulated to encode information. Any suitable modulation scheme could be used, such as, for example, frequency shift keying (FSK) or phase-shift keying (PSK). In some implementations, the acoustic signal may be in the ultrasonic frequency range, e.g., greater than about 20 kHz. In some implementations, the acoustic signal may be in the audible frequency range, e.g., about 20 Hz to about 20 kHz.

An acoustic signal representing a credential may encode data including or representing a corresponding credential identifier and any other suitable data. In addition, an acoustic signal representing a credential may encode another identifier that is linked to or otherwise associated with a corresponding credential identifier. In some implementations, a given acoustic signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate an acoustic signal, a client device may use any suitable technique for encoding a representation of a credential. For example, the client device may call a function or library routine that encodes data into acoustic signals such as the Zoosh software development kit (SDK) by Naratte, Inc. The client device can then output the acoustic signal representation of the credential from a speaker coupled to the client device for reception by a validating device.

To initiate the validation process for an acoustic signal, a client device outputs an acoustic signal representing a credential. A validating device may then receive the acoustic signal at a speaker of the validating device and decode the acoustic signal representation of the credential to generate a set of alphanumeric characters that were encoded in the acoustic signal. The validating device may use any suitable mechanism to receive and decode the acoustic signal.

In some implementations, the validating device may then validate the acoustic signal by transmitting a validation request message to a server. The validation request message may include data corresponding to the alphanumeric characters that were encoded in the acoustic signal. When the server receives the validation request message, it attempts to confirm that the presented acoustic signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the acoustic signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an acoustic signal locally without requiring interaction with a server. For example, the acoustic signal may include a certificate associated with the client device of the user presenting the acoustic signal for validation. Alternatively or in addition, the representation for the credential may be associated with a certificate that is already stored locally at the validating device. The validating device may then compare information decoded from the acoustic signal with information from the certificate to determine that the acoustic signal is valid.

Still another form of representation for a credential is an NFC signal. NFC as described herein may refer to a set of standards (e.g., ECMA-340 and ISO/IEC 18092) for client devices to establish radio communication with each other by touching them together or bringing them into close proximity (e.g., typically no more than a few centimeters). NFC as described herein may also include other suitable short range wireless communication protocols such as Bluetooth or Zigbee.

A client device may use any suitable technique for encoding a representation of a credential within an NFC signal, such as a function or library routine. An NFC signal representing a credential may encode data including or representing a corresponding credential identifier and any other suitable data. In addition, an NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To initiate the validation process for an NFC signal, a client device transmits an NFC signal representing a credential. A validating device may then receive the signal at a receiver of the validating device and decode the NFC signal representing the credential to generate the set of alphanumeric characters encoded in the signal.

In some implementations, the validating device may then validate the NFC signal by transmitting a validation request message to a server. The validation request message may include data corresponding to the alphanumeric characters that were encoded in the NFC signal. When the server receives the validation request message, it attempts to confirm that the presented NFC signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the NFC signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an NFC signal locally without requiring interaction with a server. For example, the NFC signal may include a certificate associated with the client device of the user presenting the NFC signal for validation. Alternatively or in addition, the representation for the credential may be associated with a certificate that is already stored locally at the validating device. The validating device may then compare information decoded from the NFC signal with information from the certificate to determine that the NFC signal is valid.

FIG. 1 shows a sample user interface 100 that enables a user to select from among various credentials of the user. The interface 100 can be provided as a part of a credential management application that allows a user to create a user-account and manage credentials that may be associated with the user account. In some implementations, the various credentials may be issued by different organizations. In particular, the user interface 100 includes an example of a user's wallet (identified with a "User Wallet" caption 102) that provides the user with access to numerous different credentials associated with the user. For example, the user interface 100 includes a "Gym Membership Badge" 106 issued by Armstrong's Gym and a "MicroStrategy Employee Badge" 108. In some implementations, the user-interface 100 can include account credentials 112 associated with a social network account. Examples of a social network can include Facebook®, Linkedin®, Google-F®, and MySpace®, among others. The user can select any one of these credentials from the user's wallet to output a representation of the credential from the user's client device. The user may make the selection, for example, by touching the corresponding area on a presence-sensitive display of the client device. The user can also select an Edit command button 104 to modify settings associated with the credentials, and can add a credential, issued to the user by a credential issuing organization, to the wallet by selecting command button 114.

FIG. 2 shows a sample representation of a credential. For example, when a user selects the "MicroStrategy Employee Badge" 108 shown in FIG. 1, the selected badge 200 may be displayed on the client device as shown in FIG. 2. The badge 200 includes a caption 202 identifying it as an "Employee Badge" for "MicroStrategy Incorporated." Also included is an image of the user 204 and a caption 206 that identifies the associated user as "John Smith, Chief Operating Officer." In some implementations, the client device may obtain the user's image from, for example, a memory of the client device or a server. The badge 200 further includes a control such as a swiping slider 208 that may enable a user to select from among different representations for the credential. A representation for a credential may be a depiction or rendering corresponding to a credential that enables the credential to be validated. For example, in the current position, the slider 208 causes an optical-machine readable representation for the credential 210 (e.g., a quick response (QR) code) to be displayed. In other positions, the slider 208 may facilitate displaying other representations of the credential (e.g., an alphanumeric code, an acoustic code, or an NFC code) that may be used to have the credential validated.

When a credential issuing organization issues a credential to a user through the credential management application, it also may issue one or more keys to the user. The keys can be configured to provide access to one or more physical or virtual resources controlled by the credential issuing organization. For example, the keys issued by a company can be configured to provide employees access to various physical and/or virtual resources such as a building lobby, a gymnasium, a library, one or more offices, an elevator, a lab, and/or a virtual private network (VPN), among other resources. In some implementations, a predetermined set of keys can be associated with an issued credential. For example, when MicroStrategy issues an employee ID to a user, it also may issue a predetermined set of "keys" to the user, enabling the user to unlock various different doors within the MicroStrategy office building, gain access to certain floors of the MicroStrategy building from the building's elevators, and enter/exit the MicroStrategy parking garage. Keys may also be manually associated with a given credential. For example, a user with administrative rights can assign one or more specific keys to another user. The keys can be tied into the access control systems that regulate access to the physical or virtual resources and enable the resources to be locked/unlocked or otherwise accessed by invocation of a control provided within the credential management application on the user's mobile device.

Figure 3:
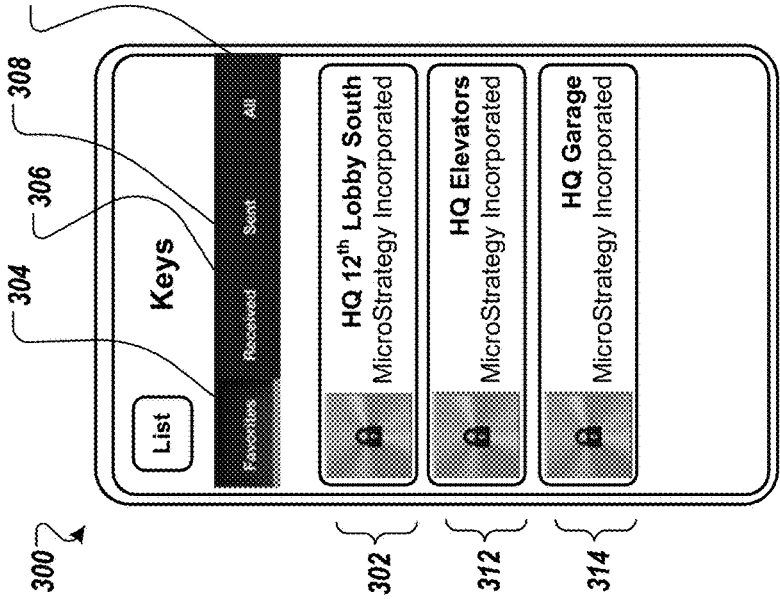
FIG. 3 is an illustration of an example of a user interface that enables a user to manage one or more keys associated with a credential.

FIG. 3 shows an illustration of an example of a user interface 300 that enables a user to manage one or more keys associated with a credential. The user interface 300 includes one or more keys (e.g., the key 302 that allows an access to the headquarter (HQ) 12$^{th}$ Lobby South, the key 312 that allows access to the HQ elevators, and the key 314 that allows access to the HQ garage) associated with a particular credential. The user interface 300 can include various controls to customize the display of the keys. For example, the user interface can include a control 304 to display the favorite keys of the user, a control 306 to display keys received from other users, a control 308 to display the keys the user has shared with other users and a control 310 to display all keys associated with the credential, or user account.

Figure 4:
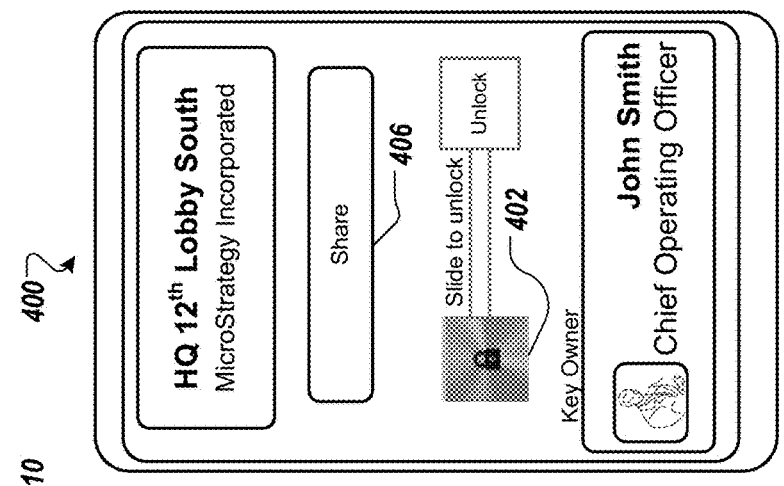
FIG. 4 is an illustration of an example user interface that enables a user to access a resource using a key.

FIG. 4 shows an illustration of an example user interface 400 that enables a user to access a resource using a key. The user interface 400 can be displayed when a user selects the key 302 shown in FIG. 3. A user can use the key 302 from the user interface 400 to access the resource associated with the key. In some implementations, the resource can be accessed by sliding the lock icon 402 to the right as shown in FIG. 4. When a user slides the lock icon 402 to the right, a request to access the corresponding resource (e.g., that identifies the requesting user) can be transmitted to a server. A determination can then be made (e.g., at the server) as to whether the requesting user is authorized to access the resource, and the access can be granted accordingly. For example, permissions and authorizations to use keys or access resources for different users may be stored on the server and the server may make the determination based on the stored permissions and authorizations. In the example shown in FIG. 4, if a determination is made that the requesting user is authorized to access the HQ 12$^{th}$ Lobby South, a door to the lobby can be unlocked in response to the access request, and a confirmatory display 502 can be displayed by a user interface 500 as shown in FIG. 5.

Figure 6A:
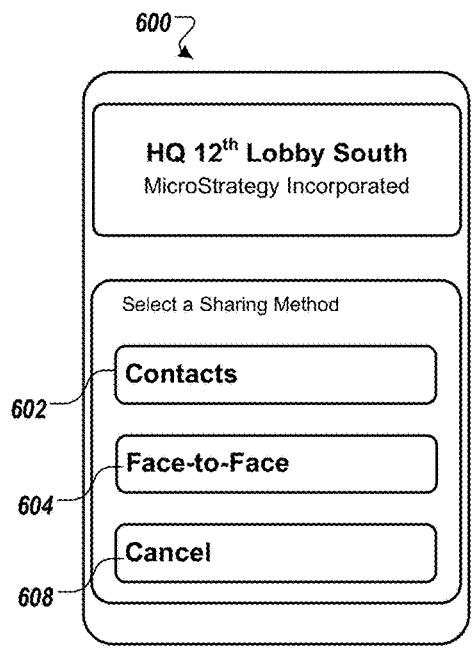
FIGS. 6A-6D are illustrations of example user interfaces that enable a user to share a key with another user.

Referring again to FIG. 4, in some implementations, the user interface 400 can also include a control 406 that enables the user to share the selected "key" with another user by selecting the icon 406. Selecting the icon 406 can launch another interface that allows the user to share the selected "key" with one or more other users. FIGS. 6A-6D are illustrations of example user interfaces that enable a user to share a key with another user. In some implementations, the user interface 600 shown in FIG. 6A is presented when a user activates the control 406 (shown in FIG. 4) to share a key. The user interface 600 can combine multiple ways of selecting a recipient for the key. For example, the user interface 600 can include a control 602 that enables a user to access one or more directories of contacts. The user interface 600 can also include a control 604 that enables a user to share the key directly with another user via one or more different peer-to-peer sharing mechanisms. The user interface 600 can also include a control 608 to cancel the key-sharing.

Figure 6B:
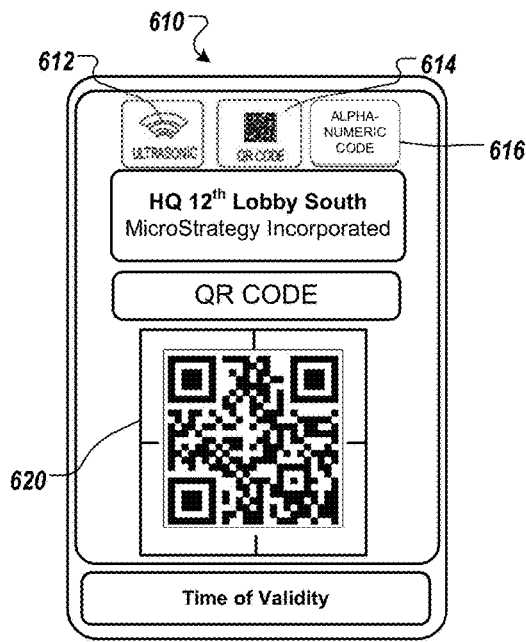

In some implementations, when a user activates the control 604, the user interface 610 shown in FIG. 6B can be provided, to allow the user to share the key with another user. In some implementations, activation of the control 604 can initiate transmission of a request to a remote server (e.g., a server associated with the credential management system) to provide one or more shareable representations of the key. In some implementations, the shareable representations may also be generated locally at the client device of the user initiating the key-sharing. In such a case, the client device generating the representation of the key may transmit information about the generated representation to a remote entity (e.g., the server associated with the credential management system) that validates a use of the key.

In some implementations, the representation of the key can include a QR code 620. An identifier of the key can be encoded within the QR code 620 such that scanning the QR code by a client device initiates a request to access the key with which the QR code is associated. For example, an intended recipient can use a client device to scan the QR code displayed on another client device. In some implementations, scanning the QR code 620 causes the identifier of the key to be decoded and sent to the server. The server can then handle the sharing of the key in accordance with one or more constraints associated with the key. For example, a constraint on the corresponding key may specify that the key can be accessed using the particular identifier only once (or another predetermined number of times).

Figure 6C:
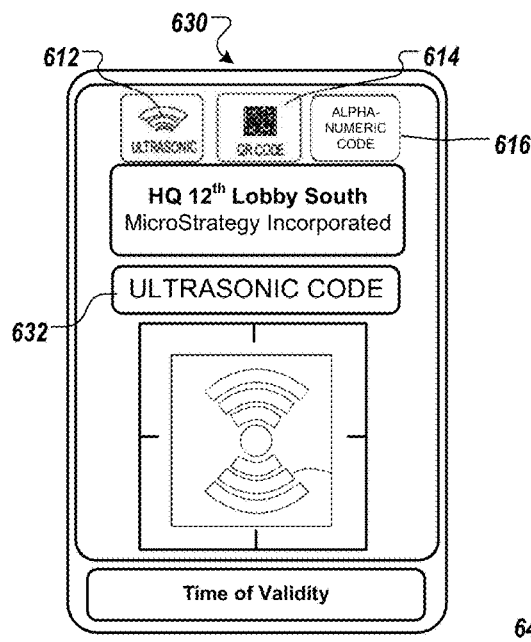

In some implementations, the user interface 610 can include multiple controls 612, 614, 616 to allow a user to choose between multiple forms of representations of the key. For example, activating the control 614 may cause the display of the QR code 620. Similarly, activating the control 612 can cause the display of another user interface 630 that allows sharing of the key using a sonic code (as shown in FIG. 6C). In some implementations, the user interface 630 can include a control 632 that causes a corresponding representation of the key to be transmitted from the client device in the form of an electromagnetic signal, or an ultrasonic or audible acoustic signal. A second client device within a vicinity of the transmitting client device can receive the representation of the key by sensing the electromagnetic or acoustic signal. Representations of the key can be exchanged between two client devices using other short range transmission methods, including, for example, near field communication (NFC), infrared communication, or Wi-Fi-based communication.

Figure 6D:
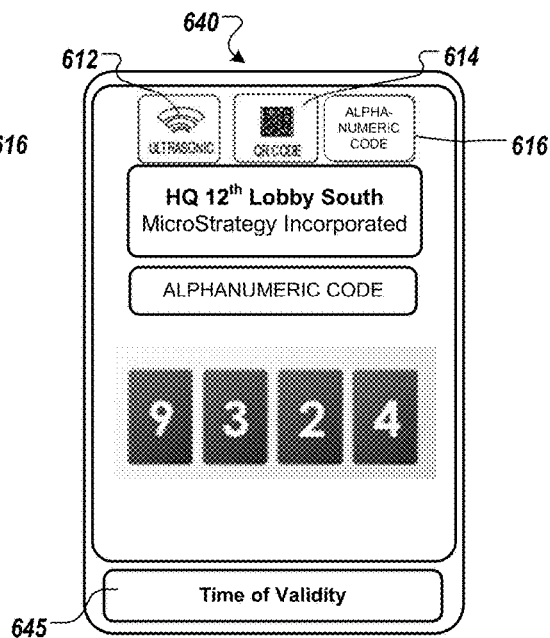

In some implementations, activating the control 616 can cause the display of another user interface 640 that allows sharing of the key using an alphanumeric code (as shown in FIG. 6D). The alphanumeric code can be verbally communicated (or shown) to a recipient such that the recipient can enter the code on his/her device to request an access to the key. In some implementations, the alphanumeric code can also be communicated to the recipient's device over a short-range transmission method, including, for example, near field communication (NFC), infrared communication, or Wi-Fi-based communication.

Figure 7:
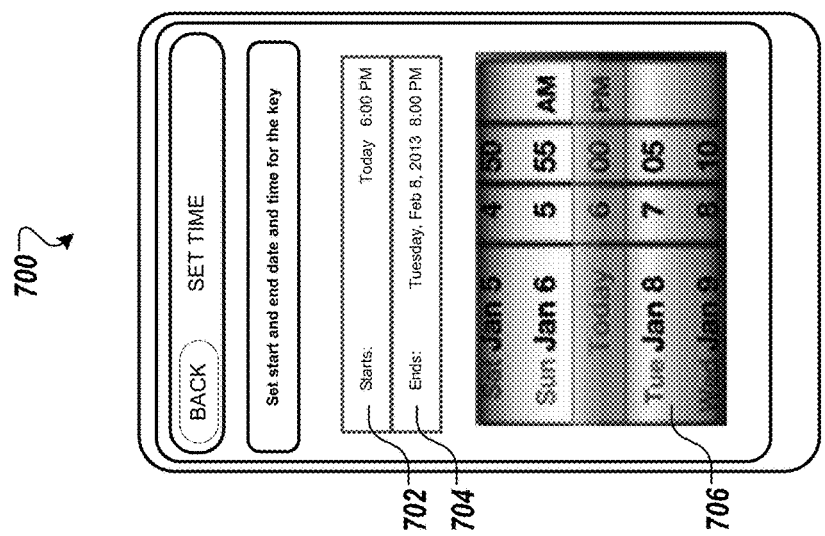
FIG. 7 is an illustration of an example user interface that allows a user to set time constraints on a key.

In some implementations, the user-interfaces 610, 630, or 640 can include a control 645 that allows a user to specify one or more constraints associated with accessing the key. For example, activating the control 645 can cause display of the example user-interface 700 shown in FIG. 7. The user-interface 700 may allow, for example, a key-owner to set a time range in which a recipient may access the key. In some implementations, the user-interface 700 can include a field 702 for specifying a start time and a field 704 for specifying an end time. The user interface 700 can also include an interactive selector 706 for selecting a date and time for each of the fields 702 and 704. In some implementations, the fields 702 and 704 may also be populated using, for example, a keypad, or voice-based input.

In some implementations, other constraints can also be associated with the representation of the key using, for example, the interface 700, or another user interface. For example, a key owner may specify the number of times that the key can be accessed using the corresponding representation. The key owner may also require the recipient to provide a set of secondary credentials in order to be granted access to the key. For example, if a key to a company resource is shared, the constraints on the key may require the recipient to prove possession of the company credentials (e.g., a company badge), before the recipient is granted access to the key. Therefore, a MicroStrategy employee who receives a key as part of receiving the employee's MicroStrategy employee credential may share the key with another user who also holds a MicroStrategy employee credential. In some implementations, the server may confirm that an intended recipient possesses a required credential before allowing the key to be shared with the recipient. This can be done, for example, by looking into a database stored at the server to verify that the recipient is registered as holding the required credential. An example of secondary credential based key sharing is described below in additional detail with reference to FIGS. 10A-10C. In some implementations, the constraints can include a constraint on an ability to share the key forward. For example, a key owner may specify that a recipient of the key is not allowed to further share the key with other users. In such a case, when the key appears within the user account of the recipient, the corresponding user interface does not include a control (e.g., the control 406 shown in FIG. 4) that allows the recipient to share the key.

In some implementations, the key owner (e.g., a credential issuing organization, or a person sharing the key) may, at any point, revoke one or more privileges associated with accessing the resource using corresponding share instance of the key. For example, if the recipient of the representation of the key tries to access the resource outside a time window for which access has been granted (e.g., normal business hours), or violates any of the constraints associated with the share instance of the key, the key owner can disable or invalidate the representation of the key such that the representation cannot be used to further access the resource. In some implementations, the credential management system can be configured to provide a log associated with the key (and/or the representation of the key) such that the log allows the key owner to review activities related to the key including activities related to the key by other users with whom the key owner has shared the key. For example, a key owner may be able to review, for example, when a particular representation of a key is used to access the corresponding resource, whether access is granted or denied, and the source of the request for the access.

A representation of a key can be shared by a user with a recipient in various ways. The recipient can be local to the user who is sharing the key, such that the user can share the key with the recipient on a face-to-face basis. In such face-to-face sharing, additional steps needed for remote sharing (e.g. over e-mail, short messaging service (SMS), or social network) can be avoided, for example, by allowing a client device of the recipient to receive a representation of the key over a short range communication media. For example, a representation of the key can be shared between two client devices using, for instance, line-of-sight communication, acoustic signals, near-field communication (NFC) protocols, Bluetooth communication protocol, or Wi-Fi based communication. In some implementations, one user can share a representation of the key (e.g., an alphanumeric code) either verbally or over a messaging system (e.g., e-mail, SMS, or instant messaging) with a second user such that the second user can request an access to the corresponding key via a user interface on a client device of the second user.

Figure 8B:
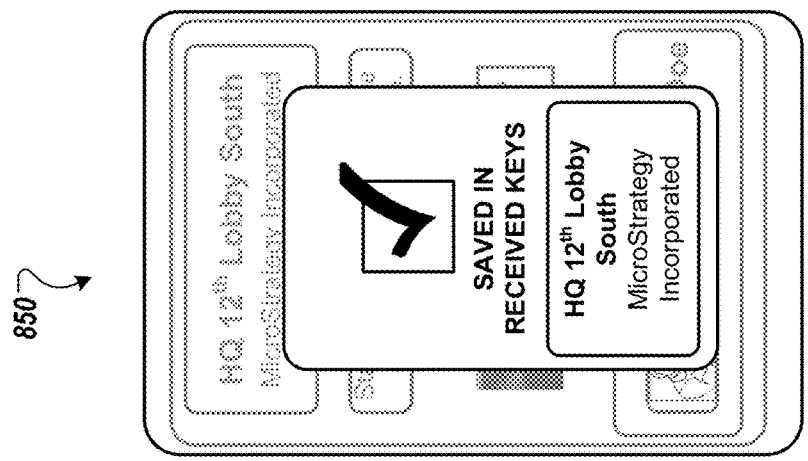
FIG. 8B is an illustration of an example user interface showing a notification that a received key has been saved within a user account.
Figure 8A:
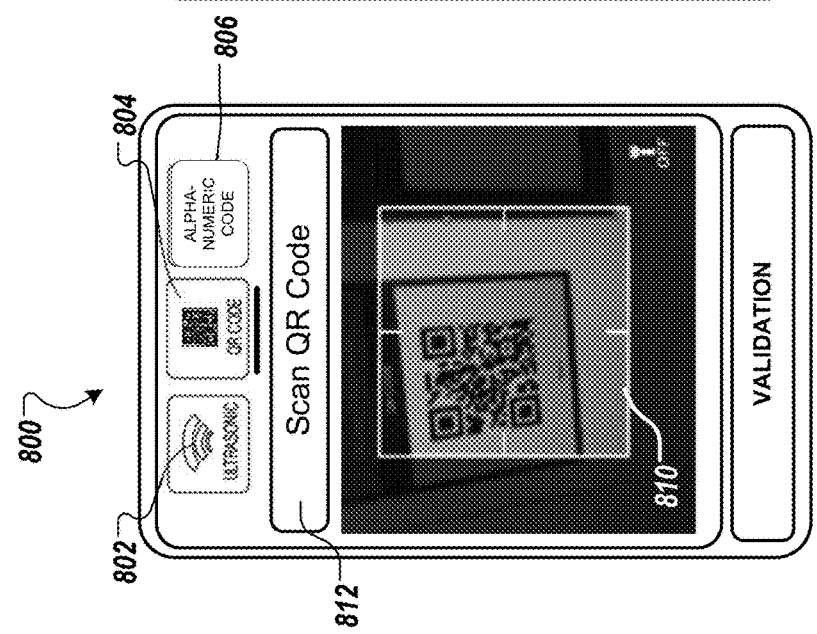
FIG. 8A is an illustration of an example user interface that allows a user to input a representation of a key.

When using a line-of-sight communication, the recipient client device can be configured to scan (for example, using an appropriate application) a QR code representation of the key. This can be done, for example, using a user interface 800 as shown in FIG. 8A. The user interface 800 can include a scan area 810 that can be used to focus on the QR code that is displayed, for example, on another client device. The focusing can be performed using a camera provided on the recipient's client device. The scanning of the QR code can be triggered, for example, using a control 812 provided on the user interface 800. The user interface 800 can also include controls 802 and 806 to select another mode for receiving the representation of the key. For example, the controls 802 and 806 can allow the recipient to launch other interfaces for receiving the representation of the key using an acoustic signal and an alphanumeric code, respectively. In some implementations, a user interface 850 (as shown in the example of FIG. 8B) can be displayed to notify the recipient that the received key is saved within the user account.

Figure 9B:
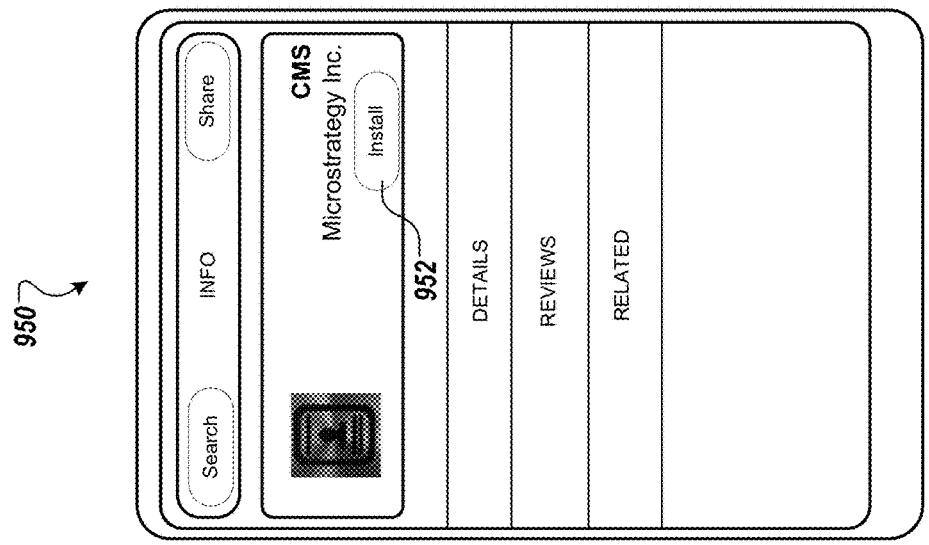
FIG. 9B is an illustration of an example user interface on a recipient device that enables a user to install an application for accessing a user account.
Figure 9A:
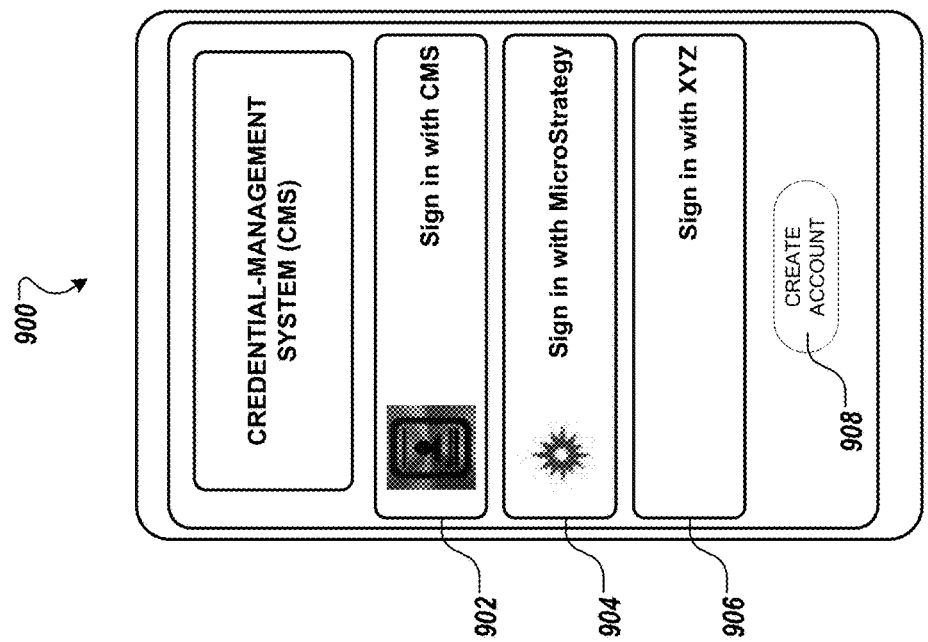
FIG. 9A is an illustration of an example user interface on a recipient device that enables a user to sign into a user account for accessing a received key.

In some implementations, the recipient may need to launch an application (e.g., an application provided as a part of the credential management system) on the client device of the recipient in order to access the representation of the key being shared. FIG. 9A is an illustration of an example user interface 900 on a recipient device that enables a user to sign into a user account for accessing a received key. In some implementations, the user interface can enable a user to sign-in using one of several options. For example, the user interface 900 can include a control 902 that allows a user to sign-in using access credentials (such as a username-password pair) created with the credential management system. The user interface 900 can also include a control 904 that allows a user to sign into a user account within the credential management system using a corporate account that has already been linked to the credential management system. The user interface 900 can also include a control 906 that allows a user to sign into a user account within the credential management system using a social network or another third party account that has already been associated with the credential management system. The third party account is typically associated with a credential issuing organization that issues a credential to the user within the credential management system. In some implementations, the user interface 900 can also include a control 908 that allows a user to set up a user account within the credential management system.

In some implementations, the user interface 900 can be provided by an application executing on a client device. If the application is already installed on the client device, and the user is already signed into the user account, displaying the user interface 900 may be bypassed. If the client device does not have the application installed, a user interface 950 (as shown in FIG. 9B) can be displayed to allow the user to install the application. The user interface 950 can be provided from a server associated with the credential management system, or from an application repository associated with a service provider independent of the credential management system. The user interface 950 can provide a control 952 that allows the user to download and install the application on the client device.

In some implementations, receipt of a shared key may require one or more levels of secondary authentication. For example, if a key that a user has attempted to share with a recipient is related to accessing a resource associated with a particular company and has been issued by the particular company, the ability of the recipient to receive the key may be conditioned on the recipient's possession of a credential issued by the particular company, such as, for example, the badge 108 described with reference to FIG. 1. In such cases, if the recipient's badge from the particular company already has been added or linked to the recipient's user account within the credential management system, the recipient is automatically provided access to the key. On the other hand, if the intended recipient has not received a credential from the particular company or otherwise linked his/her user account within the credential management system to a credential issued by the particular company, the intended recipient may be required to acquire a credential issued by the particular company before the intended recipient is allowed to access the key. For example, in such situations, a user interface 1000 (as shown in FIG. 10A) displaying a badge requirement 1004 may be displayed.

The badge requirement 1004 can be configured to include a control 1008 to allow the recipient to acquire the badge information immediately. Activating the control 1008 may cause the display of a user interface 1050 (as shown in the example of FIG. 10B) that allows the recipient to add the badge. The badge can be added, for example, by providing a username in the field 1052, a password in the field 1054, and activating the control 1056. Upon activation of the control 1056, the received key can be stored in an inbox 1072 displayed in the example user interface 1070 of FIG. 10C. Alternatively, the received key can be displayed within a user interface such as the interface 300 described with reference to FIG. 3. When a key is saved within a user's account, a record can be created within the credential management system, the record indicating that the key is linked to the corresponding user account, and that the user has access to the corresponding resource.

In some implementations, activation of the control 1056 initiates an authentication of the user with the badge issuing organization. Once the user is authenticated with the badge issuing organization (MicroStrategy in the current example), the organization can communicate to the credential management system that the user is authorized to hold the badge. The badge can then be added or linked to the user account within the credential management system. The badge requirement may also include a control 1006 that allows the recipient to choose to add the badge information at a later time.

Figure 11:
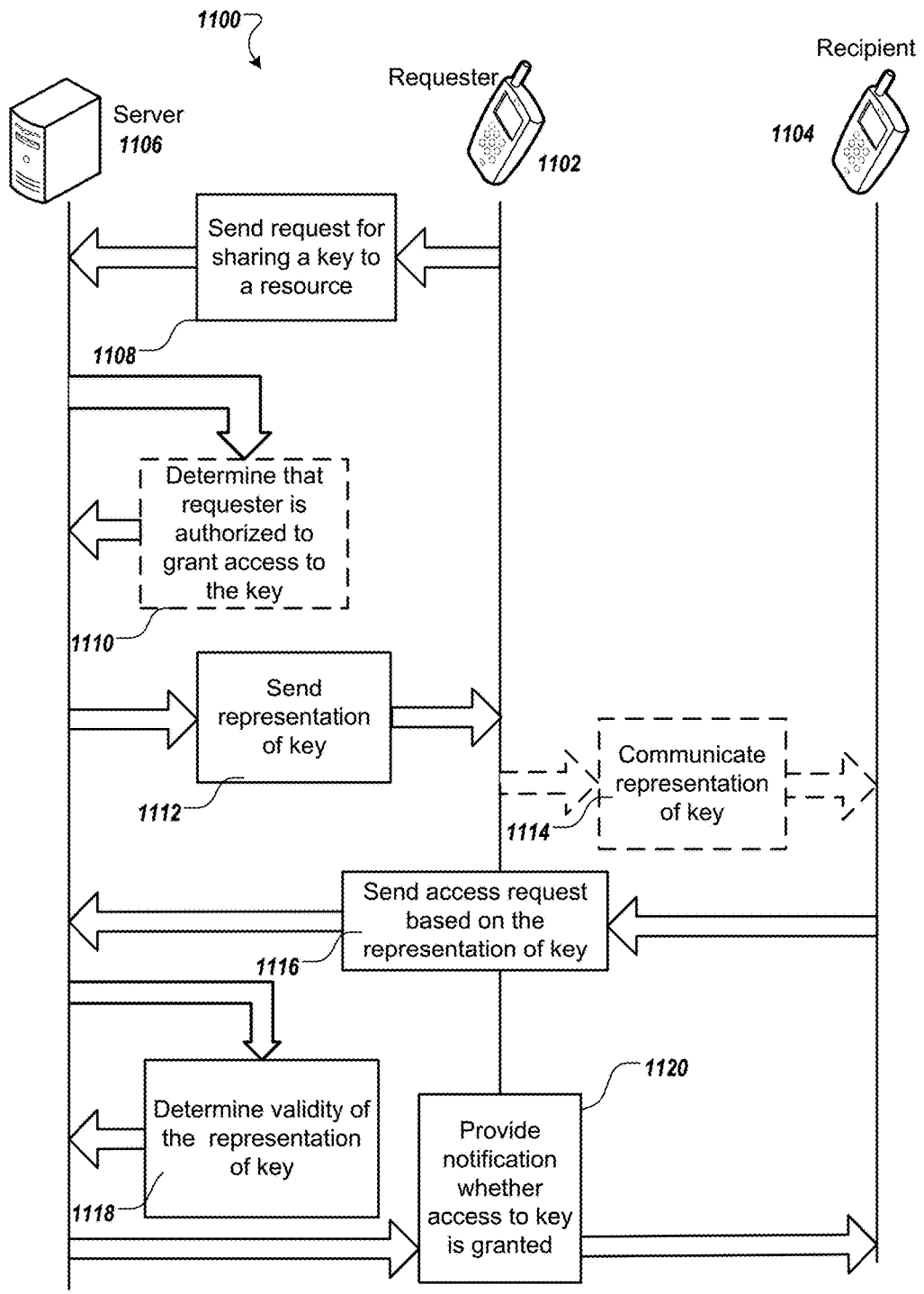
FIG. 11 is a schematic diagram representing examples of communications between a requester device, a recipient device, and a server.

FIG. 11 shows an example system 1100 for management, distribution, and validation of keys and/or credentials. As an overview, a requester using a client device 1102 transmits a request 1108 to a server 1106 that the requester intends to share a key to which the requester has access. The request can also include one or more conditions on the nature of access to be provided to the recipient by way of the key. For example, the requester can specify a time duration for which the recipient may be able to access the resource associated with the key. Upon receiving the request 1108, the server 1106 can optionally make a determination 1110 that the requester is authorized to share the key with the intended recipient. This can include, for example, checking if the requester is the owner of the key and/or has sufficient administrative privileges, from the credential issuing organization associated with the key, to share the key. For example, the server 1106 may determine whether a credential associated with the requester allows the user to share a particular key with other users. Conversely, if the server 1106 determines that the requester is trying to share a key that has been shared with the requester by another user, the server can be configured to prevent the requester from sharing the key.

In operation, the server 1106 manages and/or stores one or more credentials, associates users, groups of users, and keys with appropriate credentials, and provides the credentials and keys to users' client devices to allow the users to access various physical and virtual resources. The server 1106 can be any suitable computer or collection of computers executing software capable of managing, distributing, and/or validating representations of credentials and keys for users and groups of users via a network as described herein. In some implementations, the server 1106 can be configured to generate a representation of a key (for example, a QR code, a sonic code or an alphanumeric code) based on, for example, a request 1108 received from a client device 1102. Examples of such representations of keys have been discussed above with reference to FIGS. 6B-6D. The generated representation can be stored at the server 1106 as being associated with the corresponding key. Upon receiving the request 1108, the server 1106 can generate a reference (also referred to as a share instance) to the key. The reference can be, for example, an alphanumeric code. The representation of the key (e.g., a QR code) can be generated at the server or at the client device 1102 based on the reference generated at the server. To generate the representation of the key at the client device 1102, the server 1106 can provide the reference to the client device 1102.

Credentials, user accounts, group accounts, and administrative accounts can be stored in a database (e.g., MySQL, PostgreSQL, MS SQL Server, MongoDB), or other suitable data structure that can be accessed by the server 1106. In some implementations, the server 1106 may access the stored credentials, keys, representations of keys and/or user accounts via web services such as representational state transfer (REST) style services. User accounts may be stored in a table or collection of tables in a database or in any other suitable data structure accessible by the server 1106. The user accounts may include a variety of information such as user name, user title, user identifier (e.g., a number or character string that uniquely identifies a user), and/or the address(es) of one or more accounts and client devices owned by or otherwise associated with the user. User accounts can be created at the request of potential users through a web-based or other interface. In some implementations, the potential users may be able to create user accounts by use of an application running on a client device.

The server 1106 can then provide a notification 1112 including a representation of the key (e.g., a QR code, a sonic code, or an alphanumeric code) to the client device 1102 requesting the code. In some implementations, the notification 1112 may include information that allows the client device 1102 to generate the representation of the key locally. For example, the notification 1112 can include an URL for accessing the corresponding key, and the client device 1102 generates a representation (e.g., a QR code) that encodes the URL. In some implementations, the notification 1112 can include a reference code (e.g., an alphanumeric code) that is generated at the server 1106 and identifies the key. The client device can be configured to generate the representation (e.g., a QR code that encodes the reference code) based on the reference code.

The client device 1102 then optionally sends a communication 1114 to a client device 1104 of the recipient to provide the client device 1104 with the representation of the key. The communication 1114 can be provided over a short range communication system. For example, a QR code on the client device 1102 can be scanned using a camera on the client device 1104 (e.g., as described above with reference to FIG. 8A). In another example, a representation of the key can be transmitted from the client device 1102 to the client device 1104 using acoustic signals or radio frequency (RF) signals. In some implementations, the communication 1114 is provided to the client device over a Bluetooth® or Wi-Fi based connection. In some implementations, NFC based protocols can be used for sending the communication 1114 from the client device 1102 to the client device 1104. In some implementations, the communication 1114 can include a verbal communication, or a communication over a messaging system (e.g., e-mail, SMS, or instant messaging), such that an access to the corresponding key can be requested by entering the representation of the key via a user interface on a client device 1104.

The recipient may send an access request 1116 related to the key from the client device 1104 using the client device 1104. The access request 1116 can be sent to the server 1106, for example, by scanning a QR code displayed on another client device 1102. In some implementations, the access request 1116 may be initiated upon receiving, for example, an electromagnetic signal, an ultrasonic signal, an audible acoustic signal, or an RF signal from another client device 1102. The access request 1116 can also be initiated upon manually entering, (for example, using a physical or virtual keyboard of the client device 1104) a numeric or alphanumeric code provided to the recipient.

Upon receiving the request 1116, the server 1106 can determine if the representation of the key used for generating the request is valid. This can include, for example accessing the credential management system to verify that the share instance associated with the representation of the key has not expired. Determining the validity can also include verifying that the access request 1116 satisfies one or more constraints that may be associated with the share instance. For example, the server 1106 may verify that the recipient issued the access request 1116 within a permissible time range. Upon determining that the share instance is valid, the server 1106 can be configured to provide a notification 1120 to the client device 1104. The notification can be provided, for example, by displaying a user interface (e.g., the user interface 850 described with reference to FIG. 8B) on the client device 1104. When a key is shared, the share instance associated with the key is associated with the recipient's account. This can cause a display of the key within the user account of the recipient and enable the recipient to use the key within constraints associated with the corresponding share instance.

The server 1106 may provide data that enables client devices to present one or more suitable interfaces for sharing and accessing of keys and representation of keys. For example, the server 1106 may provide data so that the client devices can present the user interfaces described above with reference to FIGS. 1-100. In some implementations, the server 1106 may be directly accessible via a graphical-user interface or an application running on a mobile device such as the client devices 1102 and 1104.

The client devices may communicate with the server 1106 over a network. For example, the network may be a local area network ("LAN") and/or a wide area network ("WAN"), e.g., the Internet. In some versions, the server 1106 may communicate with the client devices via hypertext transfer protocol (HTTP), SMS or multimedia messaging service (MMS) or any other suitable network communications protocol. The server 1106 may access user accounts in a database to locate the appropriate users' client devices and addresses.

The client devices 1102, 1104 may be any type of computing device, including but not limited to a mobile phone, smart phone, personal digital assistant (PDA), music player, e-book reader, tablet computer, laptop or desktop computer, or other stationary or portable device, that includes one or more processors and non-transitory computer readable storage media. The application that is installed on the client devices can be written in any suitable programming language such as, for example, Objective-C, C++, Java, etc.

Figure 12:
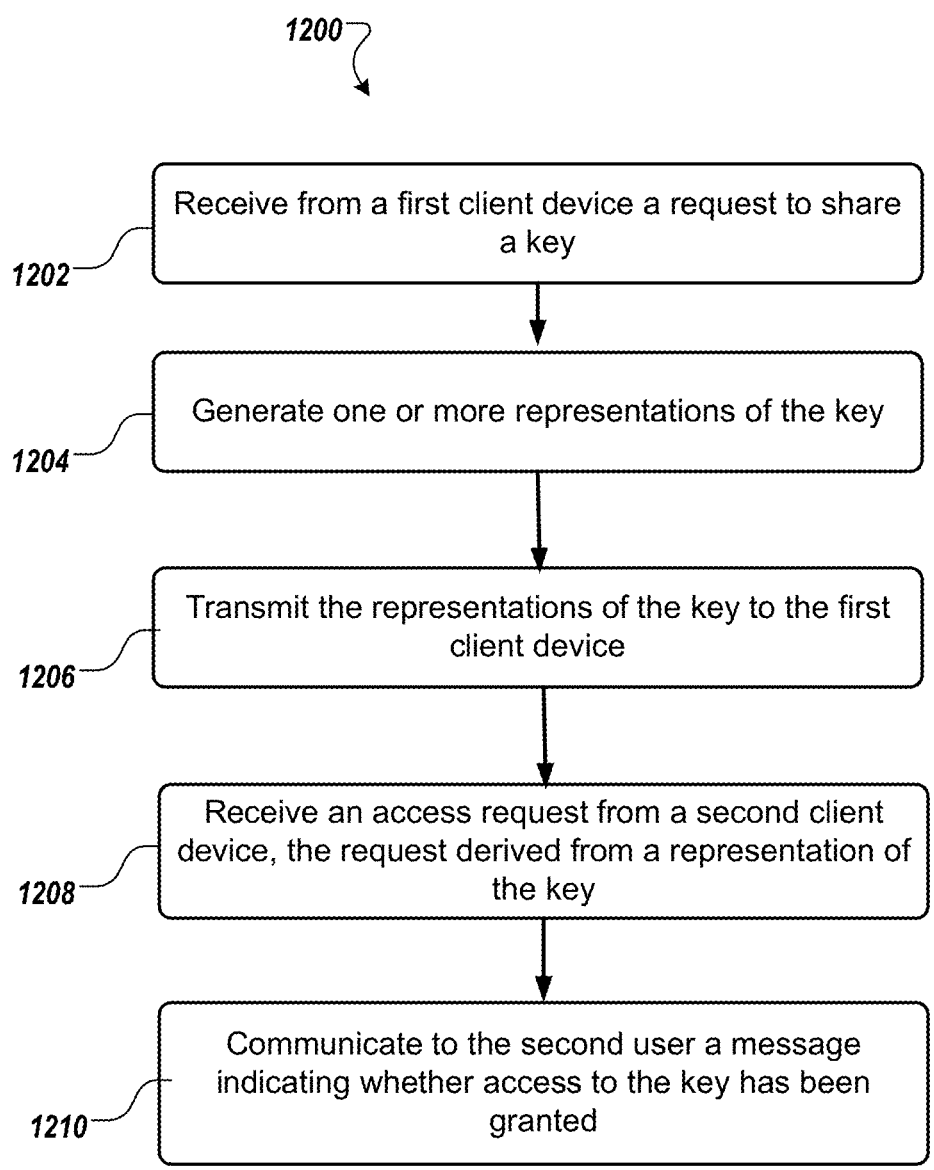
FIG. 12 is a flowchart of an example process for sharing a key between two users.

FIG. 12 shows an example process 1200 that facilitates sharing a key between two users. The operations of the process 1200 may be performed, for example, by the server 1106 described with reference to FIG. 11. Operations include receiving from a first client device a request to share a key (1202). The request can be received at the server 1106 from a client device 1102 associated with the first user. The key can be associated with a credential that is linked to or associated with a user account of the first user. The user account can be related to a credential management system, and the key can be configured to permit access to a physical or virtual resource. For example, activation of the key may unlock an electronic lock thereby allowing a user to open a door. The request can also include one or more constraints (e.g., temporal constraints) on the second user's access to the key.

Operations can include generating one or more representations of the key (1204). The one or more representations may be generated upon determining that the first user is authorized to provide the second user access to the key. This can optionally include, for example, determining the administrative privileges of the first user, with respect to the key being shared. For example, a company may allow only the executives and security officers to share keys. In such cases, determining the administrative privileges of the first user can include accessing a credential of first user to determine whether the first user is an executive or a security officer. Upon generation, the one or more representations of the key (or a generated share instance associated with the key) can be stored at the server 1106, for example, in a database accessible to the server 1106. The one or more constraints associated with the share instance may also be stored at the server 1106

Operations also include transmitting the one or more representations of the key to the first client device (1206). The transmitted information can include, for example, one or more of a QR code, an acoustic code, an alphanumeric code, or other information (e.g., a reference code associated with the share instance) that allows the first client device to generate one of the foregoing codes. The one or more representations of the key can be provided to the first client device over a network such as the Internet.

Operations include receiving an access request from a second client device, wherein the request is derived from a representation of the key (1208). The second client device can be associated with a second user account of a second user. The second user account can be associated with the credential management system. The access request can include an identifier (e.g., a code) that identifies the share instance associated with the requested key. Upon receiving the request, the server can identify a key based on the identifier within the request. In some implementations, the server can verify that the share instance has not expired and is associated with the key. Upon determination that the share instance of the key is valid, the server can associate the second user account with the key, such that the second user can access the key from within the second user account.

Operations can also include communicating to the second user whether access to the key has been granted (1210). In some implementations, this can include transmitting a notification that the key has been saved within the second user account and available to the second user. In some implementations, the communication can include a notification that access to the key has not been granted. This can happen, for example, if the server determines that the representation of the key has expired, the access request does not satisfy one or more of the constraints associated with the representation, or the key owner has revoked access privileges associated with the key (or the share instance of the key) for another reason. Access to the key may also be denied if the recipient fails to possess one or more credentials required to receive the key. For example, if access to a particular key requires the recipient to possess a company badge, receipt of the particular key can be denied if the recipient is not in possession of such a badge.

Figure 13:
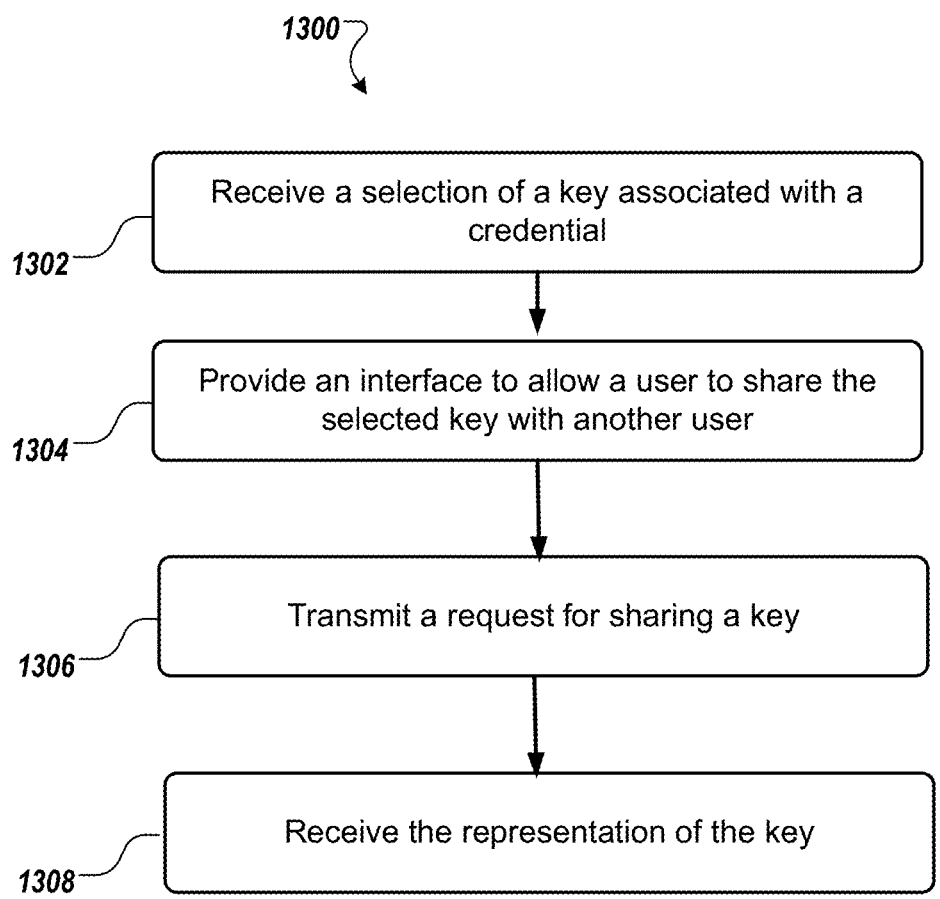
FIG. 13 is a flowchart of an example process that allows a user of a client device to share a key with another user.

FIG. 13 shows an example process 1300 that allows a user of a client device to share a key with another user. The operations of the process 1300 may be performed, for example, at the client device 1102 described with reference to FIG. 11. Operations of the process 1300 include receiving at the client device a selection of a key associated with a credential (1302). The credential can be associated with a user account of the first user. The selection of the key can be received through a user interface provided by a credential management application executing on the client device 1102.

Operations also include providing an interface to allow a user to share the selected key with a second user (1304). The interface can include, for example, a control that allows the user to share the selected key with the second user without having to use an e-mail or messaging service. This can happen, for example, when the second user is local to the user, such that the key can be shared on a face-to-face basis. When the second user is local to the user, the control to share the key locally enables the user to bypass additional steps of using a messaging system or social network platform to communicate the key to the second user.

Operations also include transmitting a request for sharing a key (1306). The request can be transmitted, for example, to a server (e.g., the server 1106 of FIG. 11. In some implementations, the representation of the selected key can be generated at a server (e.g., the server 1106 described with reference to FIG. 11) and transmitted to the client device 1102. In some implementations, the representations can be locally generated at the client device 1102 based on information received from the server 1106 in response to the request. For example, one or more representations (e.g., a QR code or a sonic code) of the key can be generated at the client device 1102 based on a reference code generated at the server. In some implementations, the client device can communicate an identification of the locally generated representation such that the server can associate the representation to the selected key. In some implementations, the user may specify one or more constraints associated with accessing a corresponding resource using the representation of the selected key. The constraints can also be pre-defined, for example, by an organization issuing the key. For example, if the key is associated with a credential from a particular company or organization, anyone requesting access to the selected key using a corresponding representation may be asked to establish possession of a credential from the same company or organization. In another example, the one or more constraints can include limitations on the number of times the representation can be used for accessing the corresponding key, the time of the day at which access can be requested, or whether the representation can be shared forward by the recipient. For example, the constraints on a particular representation (e.g., a QR code) may specify that the same representation can be used to share the key with up to ten different individuals.

Operations also include receiving a representation of the selected key (1308). The representations of the key can be received, for example, using one or more user interfaces described with reference to FIGS. 6B-6D. The one or more representations of the selected key can include, for example, a QR code, a sonic code, or a text-based representation (e.g., an alphanumeric or numeric code) associated with the selected key. The representations of the selected key can then be shared with one or more recipients using, for example, a NFC based communication, a Wi-Fi based communication or an acoustic signal based communication between two client devices. In some implementations, a visual representation such as a QR code or barcode displayed on one device may be scanned by another client device with the aid of a camera or barcode scanner, respectively.

Figure 14:
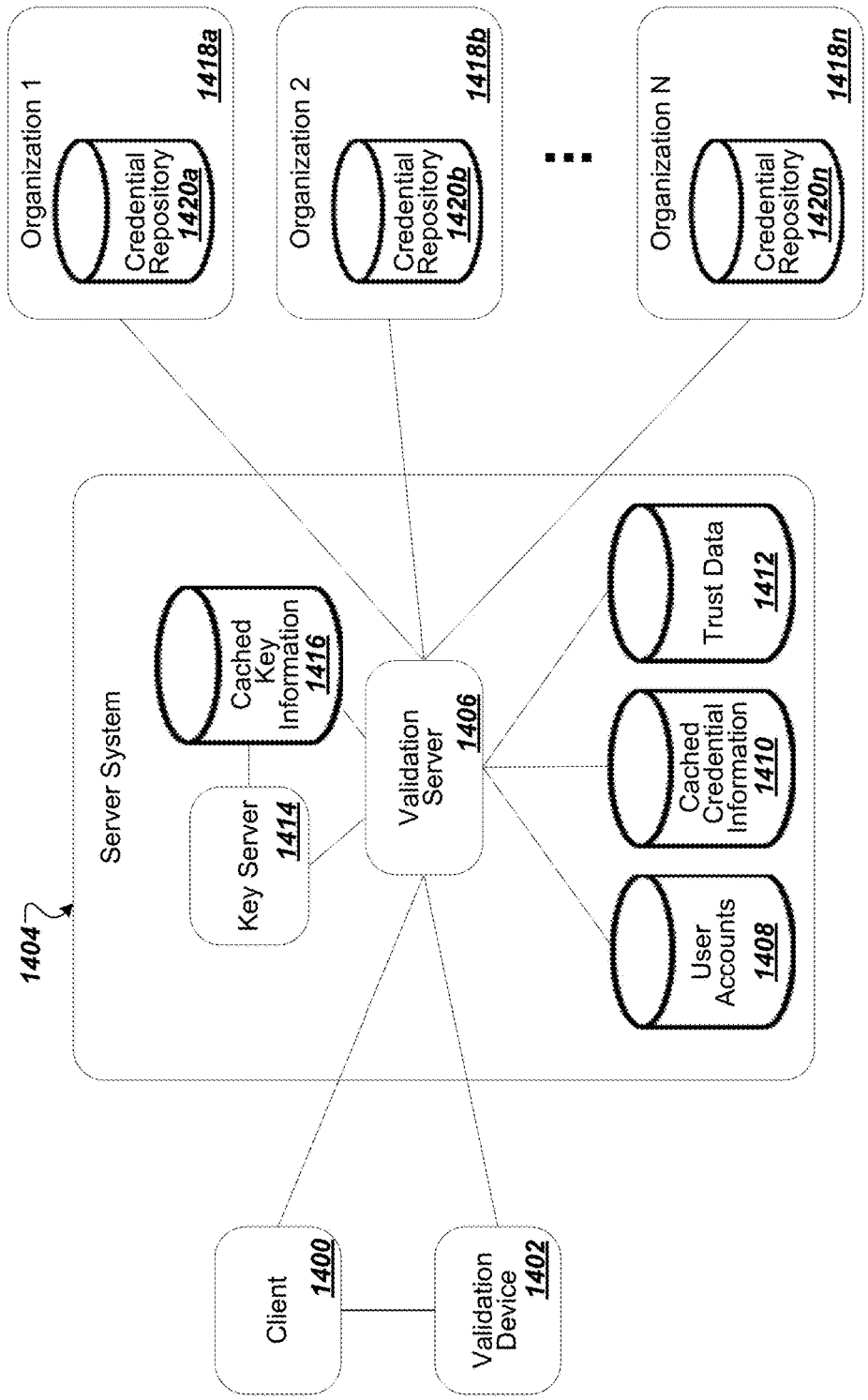
FIG. 14 illustrates an example of a credential management system.

Referring now to FIG. 14, an example of a credential management system is illustrated. In this example, the system includes a client device 1400, a validation device 1402, and a server system 1404. The client device 1400 can operate, for example, a mobile device-based credential management application. The validation device 1402 may be any device that, for illustrative and exemplary purposes, is used to validate a credential and/or key of a user of client device 1400. The client device 1400 may include any electronic device that is capable of communicating with the server system 1404 including, but not limited to, a mobile phone, smart phone, personal digital assistant (PDA), electronic book (e-book) reader, tablet computer, laptop, or other device that includes one or more processors and non-transitory computer readable storage media. The credential management application that is installed on the client device 1400 is in communication with the server system 1404. The credential management application acts as a platform for managing credentials and related resources (e.g., keys) issued to multiple, different users by various credential-issuing organizations. The server system 1404 can be substantially similar to the server 1206 described with reference to FIG. 12.

The server system 1404 can include a validation server 1406, a user account data store 1408, a credential data store 1410, a trust data store 1412, and a key data store 1416. The validation server 1406 can be involved in the process of validating credential issuing organizations as well as validation of credentials and/or keys. The validation server 1406 authenticates credential issuing organizations that would like to make credentials and/or keys available to users of the credential management application. The validation server 1406 also validates credentials and/or keys held by users of the credential management system through communication with credential management applications operated on user devices, such as client device 1400.

The user account data store 1408 stores user account information, the credential data store 1410 stores credential information associated with user accounts, the trust data store 1412 stores trust rules provided by credential-issuing organizations and/or restrictions specified by the user to govern the provisioning of credentials and/or keys on the mobile device 1400, and the key data store 1416 stores keys associated with the credentials. Users of the credential management application may set up a user account that allows the user to store personal information as well as the credentials and related resources (e.g., keys) issued to the user. Each user account may include identification information for the user and credential/key data that defines credentials and/or keys held by the user. The server system 1404 may maintain accounts for multiple different users with each user account specific to a user, as well as maintain the credentials and/or keys held by the specific user.

The validation server 1406 is in communication with the user account data store 1408, the credential data store 1410, the trust data store 1412, and the key data store 1416, for example, to manage and validate credentials and related resources (e.g., keys). The validation server 1406 authenticates and establishes connections with various trusted credential-issuing organizations, such as Organization 1, Organization 2, . . . , Organization N that operate systems 1418*a*, 1418*b*, . . . , 1418*n*, respectively, as shown in FIG. 14. The number of credential-issuing organizations 'n' can be any suitable positive integer. The server system 1404 may use a variety of information and techniques to communicate with the credential issuing organization systems 1418*a*-1418*n*. For instance, the server system 1404 may use an electronic address (e.g., a uniform resource locator (URL)) to communicate with the credential issuing organizations 1418*a*-1418*n* and a set of guidelines that govern a format for exchanging communications between the credential issuing organization systems 1418*a*-1418*n* and the server system 1404.

As shown in FIG. 14, the validation server 1406 establishes multiple, different connections with multiple, different credential issuing organization systems 1418*a*-1418*n*. The credential-issuing organizations may include one or more universities, one or more companies, and one or more government agencies, among other organizations. One or more of the credential issuing organization systems 1418*a*-1418*n* may maintain a credential repository (e.g., credential repositories 1420*a*-1420*n* on systems 1418*a*-1418*n*, respectively).

A user may log-in to the credential management application using authentication information for one of the n credential-issuing organizations, for example, by using authentication information for Organization 1. In some implementations, the server system 1404 may receive the authentication information and determine that the user has been authorized by Organization 1, for example, by determining that the user's authentication information has been validated by Organization 1. As a result of determining that the user has been authorized by Organization 1, the server system 1404 may enable the user to use one or more credentials and/or keys issued by Organization 1. In addition, as a result of determining that the user has been authorized by Organization 1, the server system 1404 may enable the user to use one or more credentials and/or keys issued by other credential-issuing organizations, such as Organization 2.

For example, the client device 1400 may attempt to use credentials and/or related resources (e.g., keys) from the credential issuing organization system 1418*b*, operated by Organization 2. The validation server 1406 sends a request to the credential-issuing organization system 1418*b* for credential information of a user of the client device 1400. The credential-issuing organization system 1418*b* accesses data from the credential repository 1420*b* and provides credential information from the accessed data to the validation server 1406. In some implementations, a credential-issuing organization system 1418*b* may transmit the credential information to the server system 1404 in a specific format specified by the server system 1404. For example, the credential-issuing organization system 1418*b* may transmit the credential information to the server system 1404 as a JavaScript Object Notation (JSON) object. Additionally or alternatively, the credential information may have certain fields to be filled by the credential-issuing organization system 1418*b* as specified by the server system 1404. The fields may include group name, user name, title of credential or badge title, expiration date, cache until date, and an extra field. The credential information also may include additional information. Such additional information may be communicated as encryption key-value pairs or it may be communicated as binary data or any other suitable data format. Additional information may include a photo of the user, or the logo of the credential-issuing organization.

After receiving the credential information from the credential-issuing organization system 1418*b*, the server system 1404 may add one or more credentials and/or related resources (e.g., keys) to the user's account based on the received credential information. For example, the server system 1404 may identify an account associated with the user and associate, with the account, one or more credentials and/or keys defined by the credential information. In this example, the server system 1404 may store the credential information in association with the account of the user or the server system 1404 and may store other information representing the one or more credentials or keys defined by the credential information.

The validation server 1406 may have accessed, at any suitable time, the trust data store 1412 to determine that the user should be enabled to use the credential and/or key from Organization 2, based on trust rules established by Organization 2 and/or by a user of the client device 1400. The trust data may indicate that Organization 2 trusts the authorization of the user by Organization 1, and is willing to make one or more of its credentials and/or keys accessible to the user as a result of the user being authorized by Organization 1. Based on the accessed trust data, the validation server 1406 provides credential information for Organization 2 to the client device 1400 for display through the credential management application to the user.

In some examples, after a credential and/or key is added to a user's account, the server system 1404 may sign the added credential and/or key and pass the added credential and/or key to the user device, where the added credential and/or key is displayed by the mobile credential management application with the list of credentials and/or keys associated with the account of the user. In these examples, some or all of the credential information for each of the credentials and/or keys associated with the account of the user is stored at the client device by the mobile credential management application. Accordingly, the mobile credential management application is able to display the list of credential and/or keys without communicating with the server system.

In some implementations, credential information is not stored at the client device and the user may be required to retrieve credentials and/or keys from the credential-issuing organization each time the user selects to view a list of credentials and/or keys. In these implementations, the user may be required to go through the entire authentication process each time the user selects to view the list of his/her credentials and/or keys.

In some examples, the server system 1404 may store cached versions of the credentials and/or keys and may retrieve credentials and/or keys from storage (e.g., from the cached credential data store 1410 or from the cached key data store 1416) to display when the user selects to view a list of credentials and/or keys at the mobile credential management application. In these examples, the mobile credential management application communicates with the server system 1404 to display the list of credentials and/or keys, but the user is not required to go through the entire authentication process to view the list of credentials and/or keys. Where a cached version of a credential and/or key is stored by the server system 1404, the server system 1404 may periodically request updated versions of the credential and/or key from the credential-issuing organization to ensure that the version of the credential and/or key that is displayed to the user is the most current version and that the credential and/or key has not been revoked by the credential-issuing organization.

Credentials and/or keys issued to a user by a credential-issuing organization may be cached (e.g., in the cached credential data store 1410 or in the cached key data store 1416) for a specified period of time (e.g., until a cache-until-date associated with the credential or key). The cache-until-date, for example, defines a date until which a cached version of the credential or key may be provided to the user without the server system having to communicate with the credential-issuing organization to confirm the continued validity of the credential or key. As an example, when the cache-until-date for a credential has not passed, the server system 1404 may access, from electronic storage at the server system 1404, a cached version of the credential and use the cached version of the credential to send the credential (e.g., send a user an updated list of the user's credentials) or validate the credential (e.g., confirm to another user that the user's credential is valid). When the cache-until-date for the credential has passed, the server system 1404 communicates with the credential-issuing organization that issued the credential to receive updated credentials. For example, an employer may define a cache-until-date corresponding to twenty-four hours from time of issuance for an employee credential issued to an employee by the employer. In this example, if the server system 1404 has received information for the employee credential from the employer's system less than twenty-four hours prior to the employee's attempted use of the credential (e.g., presentation of the credential to gain access to the employer's building), the server system 1404 may validate the use of the employee credential without having to communicate with the employer's system. If not, the server system 1404 communicates with the employer's system to receive updated credential information for the employee credential and validates the use of the employee credential based on the updated credential information for the employee credential.

Credentials and/or keys also may be associated with an expiration date. When a credential or key is associated with an expiration date, the credential or key may be stored by the server system 1404 until the expiration date. For instance, when the server system 1404 determines that the expiration date of a credential has passed, the server system 1404 may delete the data defining the expired credential and remove the expired credential from the user's account. In some implementations, when a key is shared between users via creating a share instance for the key, the share instance can also be associated with an expiration date/time.

The server system 1404 may, in some implementations, refresh one or more credentials and/or keys for a user. For example, the server system 1404 may refresh a credential for any appropriate reasons, such as in an effort to have an up-to-date version of the credential available to the client device through the credential management application. Refreshing a credential or key may include sending updated credential information to the client device 1400, which the client device 1400 may display and/or store. Refreshing one or more credentials or keys may occur based on actions taken by the user through the credential management application, such as providing input to display a current version of a particular credential or key or a current version of a list of credentials or keys held by the user. Credentials or keys stored on the client device 1400 also may be periodically refreshed (e.g., daily, weekly, etc.) by the server system 1404 so that the credential information stored on the client device 1400 is reasonably up-to-date.

There may be various different triggers that cause the server system 1404 to determine to refresh one or more credentials and/or keys. For example, in some implementations, the server system 1404 may determine to refresh a credential based on a cache-until-date associated with the credential expiring. For example, an employee badge may have a cache-until-date of one week. At the end of the week, the server system 1404 may determine to refresh the badge to determine if a newer version of the badge is available. Additionally or alternatively, the server system 1404 periodically may determine to refresh a credential or key to ensure that the credential or key still is valid and has not been revoked by the credential-issuing organization that issued the credential or key. The server system 1404 also may determine to refresh a credential or key in response to receiving a request to access the credential or key from the user to whom the credential or key was issued and/or in response to a request to validate the credential or key.

A user may add credentials and/or keys from more than one credential-issuing organization to his/her user account.

For example, the user may wish to add a degree from a University, as well as an employee badge from his/her place of employment. In this example, the multiple credentials may be added in multiple, separate requests to add the credentials. In some implementations, a credential-issuing organization may provide several types of credentials to a user such that the user's account includes multiple, different credentials issued by the credential-issuing organization to the user. Additionally or alternatively, a user may receive credentials (and related resources, such as keys) from several different credential-issuing organizations such that the user's account includes at least a first credential (and related resources) issued by a first organization and a second credential (and related resources) issued by a second organization. The credential management system may maintain accounts for many different users, and may manage credentials and keys issued to these users by many different organizations.

The features described can be implemented in digital electronic circuitry, or in computer hardware, firmware, software, or in combinations of them. The apparatus can be implemented in a computer program product tangibly embodied in an information carrier, e.g., in a non-transitory machine-readable medium such as a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, various other modifications may be made without departing from the spirit and scope of the disclosure. Accordingly, other implementations are within the scope of the following claims.

What is claimed is:

1. One or more non-transitory computer-readable storage media including instructions, which upon execution by one or more processors, cause the one or more processors to perform operations comprising:
   receiving, by one or more servers and from a first client device associated with a user account of a first user, a request to share a key associated with the user account of the first user, wherein the key permits access to a resource;
   in response to receiving the request to share the key, determining, by the one or more servers, whether the first user is authorized to share, with another user, the key associated with the user account of the first user;
   in response to determining that the first user is authorized to share, with another user, the key associated with the user account of the first user, generating, by the one or more servers, one or more representations of the key;
   transmitting the one or more representations of the key from the one or more servers to the first client device;
   receiving, by the one or more servers and from a second client device associated with a user account of a second user, a request to access the key, the request being derived from one of the one or more representations of the key; and
   communicating, from the one or more servers to the second client device, a message indicating whether access to the key has been granted.

2. The one or more non-transitory computer-readable storage media of claim 1, wherein the one or more representations of the key comprise one or more of a Quick Response (QR) code, an acoustic code, and an alphanumeric code.

3. The one or more non-transitory computer-readable storage media of claim 1, wherein the key is linked to a first credential associated with the user account of the first user.

4. The one or more non-transitory computer-readable storage media of claim 3, wherein a second credential is associated with the user account of the second user.

5. The one or more non-transitory computer-readable storage media of claim 4, wherein the operations further comprise:
   determining whether the first credential and second credential are issued by the same organization; and
   granting the access to the key upon determining that the first and second credentials are issued by the same organization.

6. The one or more non-transitory computer-readable storage media of claim 4, wherein communicating the message includes communicating an indication that access to the key has been denied, upon determining that the first credential and second credential are issued by different organizations.

7. The one or more non-transitory computer-readable storage media of claim 1, wherein the one or more representations of the key are configured according to one or more constraints on accessing the resource using the representations of the key.

8. The one or more non-transitory computer-readable storage media of claim 7, wherein the one or more constraints include at least one of a time, a location, and a presence of the first user.

9. The one or more non-transitory computer-readable storage media of claim 8, wherein communicating the message includes communicating an indication that access to the key has been denied upon determining that the request to access the key is received outside the time identified by the one or more constraints.

10. The one or more non-transitory computer-readable storage media of claim 7, wherein the one or more constraints comprise an identification of a predetermined number of times the resource can be accessed using the representations of the key.

11. The one or more non-transitory computer-readable storage media of claim 10, wherein communicating the message includes communicating an indication that access to the key has been denied, upon determining that the key has been accessed the predetermined number of times.

12. The one or more non-transitory computer-readable storage media of claim 1, wherein the operations further comprise:
   communicating, to the first client device, a message indicating that the user account of the second user has been granted access to the key.

13. The one or more non-transitory computer-readable storage media of claim 1, wherein the operations further comprise:
   receiving, from within the user account of the second user, a request to access the resource; and
   allowing an access to the resource based on verifying that the user account of the second user is granted access to the key.

14. The one or more non-transitory computer-readable storage media of claim 1,
   wherein determining whether the first user is authorized to share, with another user, the key associated with the user account of the first user includes determining whether the first user has an administrative privilege to share the key with another user, the administrative privilege being issued by a credential issuing authority that issues the key; and
   wherein determining that the first user is authorized to share, with another user, the key associated with the user account of the first user includes determining that the first user has the administrative privilege to share the key with another user.

15. The one or more non-transitory computer-readable storage media of claim 1,
   wherein determining whether the first user is authorized to share, with another user, the key associated with the user account of the first user includes determining whether the first user is an owner of the key; and
   wherein determining that the first user is authorized to share, with another user, the key associated with the user account of the first user includes determining that the first user is the owner of the key.

16. The one or more non-transitory computer-readable storage media of claim 1, further comprising:
   in response to receiving the request to access the key from the second client device, determining that the one of the one or more representations used to derive the request are valid,
   wherein deriving the request from one of the one or more representations of the key includes extracting data from one of an audio signal, an image, and a wireless signal that includes data representing the key and generating the request based on the extracted data.

17. The one or more non-transitory computer-readable storage media of claim 16, wherein determining that the one of the one or more representations used to derive the request are valid comprises one or more of:
   determining that the one of the one or more representations used to derive the request have not expired; and
   determining that one or more constraints that control access to the resource are satisfied, the one or more constraints including a threshold number of times the resource is allowed to be accessed, a threshold number of times the key is allowed to be shared, a time period during which the resource is allowed to be accessed, and the user account of the second user including a particular registered credential.

18. A computer-implemented method comprising:
receiving, by one or more servers and from a first client device associated with a user account of a first user, a request to share a key associated with the user account of the first user, wherein the key permits access to a resource;
in response to receiving the request to share the key, determining, by the one or more servers, whether the first user is authorized to share, with another user, the key associated with the user account of the first user;
in response to determining that the first user is authorized to share, with another user, the key associated with the user account of the first user, generating, by the one or more servers, one or more representations of the key;
transmitting the one or more representations of the key from the one or more servers to the first client device;
receiving, by the one or more servers and from a second client device associated with a user account of a second user, a request to access the key, the request being derived from one of the one or more representations of the key; and
communicating, from the one or more servers to the second client device, a message indicating whether access to the key has been granted.

19. The computer-implemented method of claim 18, wherein the one or more representations of the key comprise one or more of a Quick Response (QR) code, an acoustic code, and an alphanumeric code.

20. The computer-implemented method of claim 18, wherein:

the one or more representations of the key are configured according to one or more constraints on accessing the resource using the representations of the key; and the one or more constraints include at least one of a time, a location, and a presence of the first user.

21. The computer-implemented method of claim 18, further comprising:

in response to receiving the request to access the key from the second client device, determining that the one of the one or more representations used to derive the request are valid, wherein deriving the request from one of the one or more representations of the key includes extracting data from one of an audio signal, an image, and a wireless signal that includes data representing the key and generating the request based on the extracted data.

22. A system comprising:

one or more computing devices and one or more storage devices storing instructions which when executed by the one or more computing devices, cause the one or more computing devices to perform operations comprising:

receiving, by one or more servers and from a first client device associated with a user account of a first user, a request to share a key associated with the user account of the first user, wherein the key permits access to a resource;

in response to receiving the request to share the key, determining, by the one or more servers, whether the first user is authorized to share, with another user, the key associated with the user account of the first user;

in response to determining that the first user is authorized to share, with another user, the key associated with the user account of the first user, generating, by the one or more servers, one or more representations of the key;

transmitting the one or more representations of the key from the one or more servers to the first client device;

receiving, by the one or more servers and from a second client device associated with a user account of a second user, a request to access the key, the request being derived from one of the one or more representations of the key; and communicating, from the one or more servers to the second client device, a message indicating whether access to the key has been granted.

23. The system of claim 22, wherein the one or more representations of the key comprise one or more of a Quick Response (QR) code, an acoustic code, and an alphanumeric code.

24. The system of claim 22, wherein:

the one or more representations of the key are configured according to one or more constraints on accessing the resource using the representations of the key; and the one or more constraints include at least one of a time, a location, and a presence of the first user.

* * * * *